Aug. 11, 1959     R. D. HAMILTON ET AL     2,899,024
AUTOMATIC SAFETY VALVE FOR VEHICLE BRAKE SYSTEMS
Filed Sept. 25, 1957
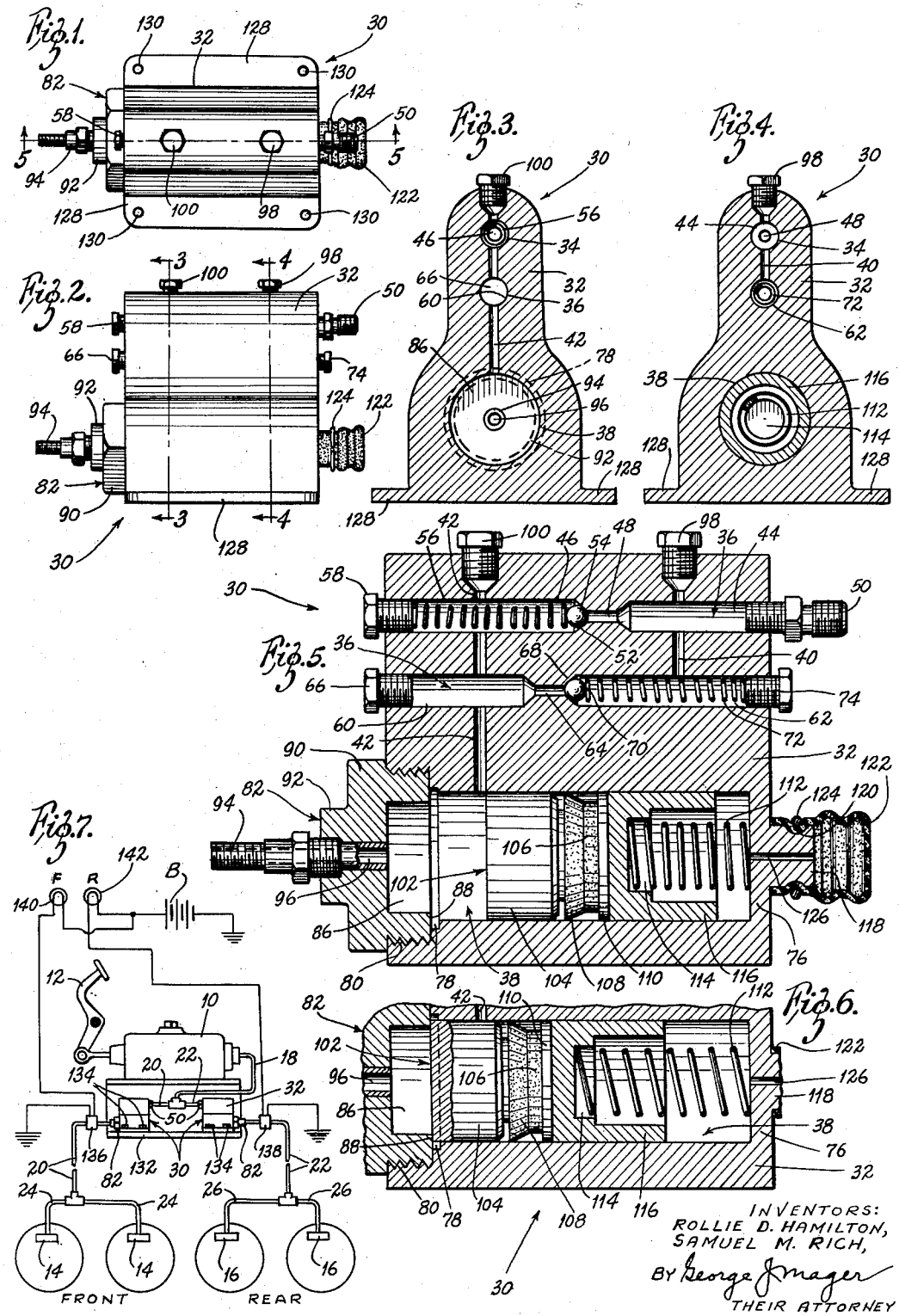
INVENTORS:
ROLLIE D. HAMILTON,
SAMUEL M. RICH,
BY George J Mager
THEIR ATTORNEY though described is subject to such modifications and changes as fall within the spirit of the invention and the scope of the appended claims.

2,899,024
AUTOMATIC SAFETY VALVE FOR VEHICLE BRAKE SYSTEMS

Rollie D. Hamilton, Affton, and Samuel M. Rich, University City, Mo.; said Hamilton assignor to said Rich Application September 25, 1957, Serial No. 686,223

3 Claims. (Cl. 188—152)

The present invention relates generally to hydraulically operating braking systems, and more particularly to pressure fluid braking systems for automotive vehicles, and is a continuation-in-part of the abandoned application of Rollie D. Hamilton, Serial No. 459,100, filed September 29, 1954.

More specifically stated, this invention relates to a novel safety or shutoff valve mechanism adapted to be interposed in a conventional hydraulic brake system between the master cylinder thereof, and the brake cylinders associated with the wheels of the vehicle.

As is well known, a conventional hydraulic system for operating the brakes of an automotive vehicle includes a master cylinder, a brake cylinder associated with each of the wheels, conduit connections or lines leading from the master cylinder to the brake cylinders, and pedal-operable mechanism for actuating the master cylinder.

In order to insure proper functioning of the master cylinder, it is requisite to maintain in the system at all times a constant volume of brake fluid, whereby physical pressure applied to the brake pedal is converted into hydraulic pressure directed against the pistons of the wheel cylinders, as is understood.

Wherefore, in braking systems of this type, the loss of brake fluid, whether in consequence of leakage or breakage, will cause malfunctioning of the brakes. In the event the fluid loss were due to leakage, the resultant malfunctioning of the brakes is likely to become increasingly noticeable each time the vehicle operator depresses the brake pedal, wherefore the hydraulic system would be checked to determine the cause of the leakage. In the event however, the fluid loss were due to breakage, particularly breakage that had occurred between braking operations, the vehicle operator would be unaware of what had happened, the loss of brake fluid would be considerable, and the braking system would not function in response to his next depression of the brake pedal.

In other words, as an automotive vehicle is being driven, particularly when being driven over rough roads, it sometimes happens that rocks, pebbles, sticks, and other loose objects will impinge against and rupture one of the lines leading from the master cylinder to the wheel brake cylinders. Excessive vibration may also cause a break in one of the lines, particularly should the line happen to have become defective gradually.

At any rate, irrespective of what caused the rupture, the brake fluid, instead of leaking gradually out of the system, would drain therefrom quickly without knowledge thereof on the part of the vehicle operator. Consequently, when the operator next depressed the pedal, he would be dismayed to find the braking system in a non-responsive condition, a condition that frequently results in a serious accident.

The primary object of the present invention is to provide means adapted to automatically prevent further draining of the braking system should one of the lines be broken, and to alert the operator of the vehicle that a loss of fluid has taken place.

To this end, the invention provides novel means that may be installed in present braking systems without requiring any changes whatever in the master cylinder and its operating mechanism, or in the wheel cylinders and the elements associated therewith.

In accordance with the concepts of the present invention, a novel valve assembly or unit is provided for the front wheel braking equipment of the system, and an identical valve assembly or unit is provided for the rear wheel braking equipment thereof. Preferably, the two valve units are supported on an appropriate bracket adjacently to the master cylinder, and in such fashion that a short line leading from said cylinder to the assemblies is shielded from road hazards, as will appear.

All of the movable valve mechanism is contained within a relatively small and compact housing in the form of a light weight casting, such as for example, a casting of aluminum. The movable mechanism includes a pair of check valves of the ball and spring type, a floating piston equipped with sealing means, a cup-shaped cylinder, a compression spring, and other elements associated with those enumerated, as will appear.

The housing is provided with inlet and outlet passages each equipped with a suitable fitting whereby the valve unit may be easily installed in a conventional braking system. Preferably also, said housing is provided with means for mounting it on a support, such as the bracket referred to hereinbefore.

Generally in conventional braking systems, when the brake pedal is in its fully released position, pressure on the fluid in the system is relieved. However, it is another object of the present invention to maintain the brake fluid in the system between each of the said two valve units and the wheel brake cylinders under slight but constant pressure at all times.

Normally, the floating piston aforesaid occupies a position wherein fluent communication obtains between the inlet and outlet passages of the unit. In the event however that a rupture occurs in one of the lines leading from the outlet passage fitting, the cylinder and compression spring arrangement included in the movable mechanism will automatically propel said piston into a position adapted to shut off the aforesaid fluent communication between the inlet and outlet passages. As a result, further drainage of brake fluid from the system via the broken line is immediately arrested, as will be more clearly explained hereinafter.

It is another object of the invention to provide means adapted to visibly indicate to the operator that a rupture has occurred in the brake system of the vehicle, wherefore it would behoove him to proceed more cautiously.

To this end, the invention contemplates a pair of pressure responsive switches, one being interpolated in the line leading to the front wheel brakes, and the other being interpolated in the line leading to the rear wheel brakes. These switches are normally open, and are so maintained as long as even the slightest hydraulic pressure is present in the line wherein each is incorporated.

Further, the invention contemplates the mounting on the dashboard or other appropriate portion of the driver compartment, of a pair of signal lamps. One of these lamps would be energized in consequence of closing the switch interpolated in the line leading to the front wheel brakes, the other in consequence of closing the switch interpolated in the line leading to the rear wheel brakes.

Objects, features, and advantages of the invention not specifically noted hereinbefore, will be referred to in the course of the detailed description to follow with reference to the drawings that accompany this specification. A more comprehensive understanding of the invention may further be had from the explanation of its operation that will follow the detailed description aforesaid.

In the drawings:

Figure 1 is a top plan view of a valve assembly or unit constructed in accordance with the teachings of the present invention;

Figure 2 is a side elevational view thereof;

Figures 3 and 4 are vertical transverse sectional views on an enlarged scale, taken respectively on the lines 3—3 and 4—4 of Figure 2;

Figure 5 is a vertical longitudinal sectional view on an enlarged scale, taken on the line 5—5 of Figure 1;

Figure 6 is a reproduction of a fragmentary portion of Figure 5, illustrating certain elements in moved positions; and Figure 7 is a diagrammatical illustration of a conventional hydraulic braking system incorporating the concepts of the present invention.

As stated, an exemplary hydraulic brake system for an automotive vehicle is schematically portrayed in Figure 7. The illustrated system includes a master cylinder designated 10; a brake pedal 12 therewith to operate said cylinder; front wheel brake operating cylinders 14; rear wheel brake operating cylinders 16; a main pressure line 18 leading from said master cylinder; a branch pressure line 20 for the front wheel brakes; a similar line 22 for the rear wheel brakes; terminal pressure lines 24 each leading to one of the front wheel brake cylinders 14; and similar lines 26 each leading to one of the rear wheel brake cylinders 16. The system illustrated and thus far described is well known.

The assembly or unit embodying the novel valve mechanism of the present invention is designated as a whole by the numeral 30. As illustrated in Figure 7, a valve unit 30 is interposed in the branch line 20 between the master cylinder 10 and the terminal pressure lines 24 for the front wheel cylinders 14. Similarly, an identical valve assembly 30 is interposed in the branch line 22 between the master cylinder 10 and the terminal pressure lines 26 for the rear wheel cylinders 16. Thus, hydraulic pressure delivered via the main line 18 to the lines 20 and 22, and thence via the lines 24 and 26 to the wheel cylinders 14 and 16, must first pass through the valve units 30 of the present invention.

One of the identical valve units 30 is illustrated most clearly in Figures 1 through 5. In these views, numeral 32 indicates the valve housing; numeral 34 designates generally a bored and counterbored passageway formed longitudinally in said housing at an upper level and extending from end to end thereof; numeral 36 designates generally a similar passageway formed in said housing at an intermediate level and extending from end to end thereof; numeral 38 designates generally a longitudinal bore formed in the housing 32 at a lower level; numeral 40 indicates a vertical bore provided in the housing near the inlet end thereof; and numeral 42 indicates a similar bore provided in said housing near the outlet end thereof.

As best seen in Figure 5, the passageway 34 includes a pressure inlet chamber portion 44, a concentric and correspondingly diametered check valve chamber portion 46, and a cylindrical port portion 48 of reduced diameter intermediate and connecting the chambers 44 and 46. Numeral 50 indicates a fitting suitable to effect a connection between the inlet chamber 44 of the valve housing, and a segment of one of the branch pressure lines 20 or 22. The cylindrical chamber portion 46 of the passageway 34 terminates at its inner end in a conical seat 52 as shown. This seat cooperates with a ball element 54 to provide a check valve that is normally maintained closed by means of a light compression spring 56 interposed in chamber 46 between the ball element aforesaid, and a threaded plug 58 that seals the outer end of said chamber.

The passageway 36 includes a pressure transmitting chamber 60, a concentric and correspondingly diametered cylindrical check valve chamber 62, and a cylindrical port 64 of reduced diameter intermediate and connecting the chambers 60 and 62. The outer end of the chamber 60 is sealed by means of a threaded plug 66. The cylindrical chamber 62 of the passageway 36 terminates at its inner end in a conical valve seat 68 as shown. This seat cooperates with a ball element 70 to provide a check valve that is normally maintained closed by means of a light compression spring 72 interposed in the chamber 62 between the ball element 70 aforesaid, and a threaded plug 74 that seals the outer end of said chamber.

The bore 38, as shown in Figures 5 and 6 does not extend from end to end of the housing 32. In other words, said bore is defined at one end by a vertical wall section 76 that is integrally provided in said housing. At the opposite end of said bore, it has formed therein a first enlarged counterbore 78, and a second further enlarged and internally threaded counterbore 80. Numeral 82 designates generally a hollow plug member having an externally threaded segment in engagement with said internally threaded counterbore 80. The plug member 82 has formed therein a circular recess 86, the diameter of said recess being smaller than that of the bore 38, whereby to provide an annular shoulder or abutment 88 for a purpose to be explained below.

With attention directed at this point to Figures 1 and 2, it is seen that the plug member 82 includes a polygonal segment 90 for the application of a suitable tool wherewith to screw said plug member into the housing. The segment 90 is exemplarily shown as being hexagonal, and it has formed integrally therewith an internally threaded laterally projecting boss designated 92. Numeral 94 indicates a suitable fitting threadingly engaging the boss 92, and having a port 96 that is normally in communication with the bore 38.

The vertical bore 40 connects the inlet chamber 44 of the passageway 34 fluidwise with the cylindrical chamber 62 of the intermediate level passageway 36. The upper end of the bore 40 is sealed, preferably by means of a threaded plug 98.

The vertical bore 42 interconnects the check valve chamber 46 of the passageway 34 fluidwise with the chamber 60 of the passageway 36, and with the bore 38. The upper end of the bore 42 is sealed, preferably by means of a threaded plug 100.

A floating piston assembly designated as a whole by the numeral 102, is slidably disposed in the bore 38. The assembly 102 includes a solid metallic piston proper 104, a ring element 106 preferably of rubber and having a flared annular flange segment 108, and a metallic circular end plate 110. Said piston assembly is constantly biased toward the annular abutment 88 by means of a compression spring 112. This spring is interposed in the bore 38 between the housing wall section 76 and an annular recess or spring seat 114 provided therefor in a cup-shaped cylinder 116 that is also slidably disposed in the bore 38, as shown.

Numeral 118 indicates a circular boss cast integrally with the housing 32 and projecting from the inlet end thereof. The external periphery of said boss has preferably formed therein an annular groove 120 for the attachment of a flexible cup 122 of bellows type by means of a split retainer ring 124. Provided centrally in the boss 118, and extending longitudinally also through the housing wall section 76, is an air bleeder port 126, whereby in conjunction with said bellows cup 122, the cylinder 116 may move freely in the bore 38, as is understood. At its bottom, the housing 32 is preferably provided with lateral flanges 128 having holes 130 therein, as particularly illustrated in Figure 1.

Reverting to Figure 7, numeral 132 designates a channel-shaped bracket that may, for example, be secured in any appropriate manner to the underside of the master cylinder 10. Mounted on the lower leg of the bracket 132 by means of cap screws 134 that pass through the holes 130 aforesaid, is a pair of valve units 30 that have their inlet ends facing one another. With this arrangement, the main pressure line 18, and the segments of the branch lines 20 and 22 that are connected to the fittings 50, are shielded from road hazards. It is to be understood however, that this schematically illustrated disposition of the valve assemblies 30 is given by way of example only.

In accordance with the teachings of the present invention as previously stated, a conventional pressure-responsive switch 136 is interpolated in the line 20, preferably adjacent the outlet end of the unit 30 serving the brake cylinders 14 for the front wheels. In like manner, a similar switch 138 is interpolated in the line 22 adjacent the outlet end of the unit 30 serving the brake cylinders 16 for the rear wheels of the system.

Numeral 140 designates a first signal light preferably mounted on the dashboard, or at any appropriate location in the driver compartment where it may be readily observed by the operator of the vehicle. As schematically shown, the switch 136 and the light 140 are in a circuit deriving its energy from the vehicle battery B. Preferably, the light 140 would be appropriately labeled, as suggested by the letter "F," so that energization of said light would indicate to the operator that the front wheel brakes have become inoperative.

Numeral 142 designates a second signal light mounted similarly to the first. As schematically shown, the switch 138 and the light 142 are in a circuit also deriving its energy from the vehicle battery B. Preferably, the light 142 would also be appropriately labeled, as suggested by the letter "R," so that energization of said light would indicate to the operator that the rear wheel brakes have become inoperative.

Operation

Normally, that is when the brake pedal 12 is in released or idle status, the corresponding movable elements of each valve unit 30 are disposed as demonstrated in Figure 5. At such times, all of the hollow portions of the units 30, as well as those of the other components of the braking system, are filled with brake fluid as is understood. In the ordinary system, the brake fluid would not necessarily be under pressure. In a system incorporating the present invention however, that portion of the brake fluid in the valve unit 30 and in the lines leading therefrom to the wheel cylinders would be under slight pressure. This pressure however, would be insufficient to actuate the wheel cylinders, but sufficient to maintain the respective piston assemblies 102 in approximately the position shown by counteracting the biasing force of the compression spring 112, as will be more fully explained. Furthermore, said pressure would be sufficient to maintain the switches 136 and 138 in open status, as is understood. Leakage of fluid past the piston assembly 102 is prevented by the resilient annular flange segment 108 that sealingly engages the inner periphery of the bore 38.

Assuming now that the operator depresses the pedal 12, hydraulic pressure produced in the master cylinder 10 will be transmitted via main line 18, branch lines 20 and 22, and terminal lines 24 and 26, to the front wheel cylinders 14 and the rear wheel cylinders 16, whereby to apply the brakes in conventional fashion.

Inasmuch as hereinbefore noted, one valve unit 30 is interpolated in the branch line 20 and another in the branch line 22, hydraulic pressure transmitted to the front wheel brake cylinders 14 must pass through the valve unit 30 in line 20, and hydraulic pressure simultaneously transmitted to the rear wheel brake cylinders 16 must pass through the valve unit 30 in line 22.

Figures 5 and 6 depict the valve unit 30 that is interpolated in branch line 20, and in the interest of brevity, the immediately following observations will be directed thereto, it being understood that the same observations are applicable to the unit 30 that is interpolated in the line 22.

In response to depression of pedal 12, hydraulic pressure enters the inlet chamber 44, being delivered thereto from line 20 via the inlet fitting 50. Thus, the check valve ball element 54 is unseated and the fluid flows via port 48, chamber 46, and vertical bore 42 into longitudinal bore 38, thence via port 96 of the outlet fitting 94 into the continuation segment of line 20 and on to the front wheel brake cylinders 14 via the terminal lines 24. When the pedal 12 is released, the hydraulic pressure returns via fitting 94 and its port 96 to the bore 38, proceeds via vertical bore 42, chamber 60, and port 64 of the intermediate level passageway 36 to unseat the check valve ball element 70, and thereupon continues its flow via bore 40, chamber 44, fitting 50, branch line 20 and main line 18 to the master cylinder.

It is to be noted however that in accordance with the concepts of this invention, all of the hydraulic pressure existent to the left of the piston assembly 102 (as viewed in Figure 5) does not return to the master cylinder when the pedal 12 is released. That is to say, the resilience of the compression spring 72 is such as to permit unseating of the ball element 70 until the returning hydraulic pressure to the left of said ball drops below a predetermined value, whereupon said spring seats the ball element to close the valve. The biasing force of the spring 72 is greater than that of the compression spring 112. Therefore, although the hydraulic pressure thus preserved in the system between the valve unit and wheel cylinders is sufficient to maintain the piston assembly 102 in the disposition thereof shown, the pressure is no longer sufficient to unseat the ball 70. Nor is the pressure sufficient to operate the wheel cylinders, as hereinbefore mentioned.

Assuming now that for any reason whatsoever the branch line 20 leading from the first valve unit 30, or one of the terminal lines 24 leading to the front wheel brake cylinders 14 should break or be broken, the fluid in bore 38 to the left of the piston assembly 102 (as viewed in Figure 5), would begin to drain from said unit. In consequence of this release of hydraulic pressure, the compression spring 112 would instantly expand whereby to propel the piston assembly 102 leftwardly until the piston 104 thereof would engage against the abutment 88, in which position said piston seals off the lower end of the bore 42, as illustrated in Figure 6. Thus it should be apparent that further drainage of fluid from the system is prevented, so that when the operator next depresses the pedal 12, hydraulic pressure will be transmitted only to the cylinders 16 whereby to apply the brakes of the vehicle rear wheels.

Assuming now that the breakage of said branch line 20 or one of the terminal lines 24 had occurred between brake applications, the operator of the vehicle would not be cognizant of the condition then existing in the braking system. However the interpolation of the switch 136 in the line 20 outside the housing 32 but preferably adjacent the outlet end thereof, and the provision of the signal lamp 140 within ready view of the operator, would serve to alert the latter to the condition aforesaid wherein only the rear wheel brakes are operative. In other words, the switch 136 closes simultaneously with the leftward movement of the piston assembly 102. As a result, the "F" signal lamp 140 is energized and remains "on," thus continually warning the operator to drive at a reduced rate of speed and to apply the brakes gently until repairs can be made.

Assuming now that for any reason whatsoever the branch line 22 leading from the second valve unit 30, or one of the terminal lines 26 leading to the rear wheel brake cylinders 16 should break or be broken, then the second valve unit 30, the pressure switch 138, and the "R" signal 142 would function in the manner already described, so that when the operator next depresses the pedal 12, hydraulic pressure will be transmitted to the cylinders 14 whereby to apply the brakes of the vehicle front wheels.

It should thus be manifest that in the event of a break in one of the system's front wheel lines, depression of pedal 12 will effect the application of the rear wheel brakes. Conversely, in the event of a break in one of the system's rear wheel lines, depression of pedal 12 will effect the application of the front wheel brakes.

In other words, the present invention provides novel means adapted to render a conventional hydraulic braking system at least fifty percent effective under the emergency conditions described. Further, the present invention also provides means warning the operator that he is driving under the said emergency conditions described.

It is noted at this point, that although the invention has been illustrated and described in conjunction with a personally operable brake system, it is to be understood that the invention is not necessarily limited to such system, but will function just as effectively and efficiently in a hydraulic power braking system.

In view of the foregoing description augmented by an inspection of the drawings, it should be manifest that our invention provides novel means for achieving its objectives. It is to be understood however, that the invention is not limited to the precise details of structure illustrated and described, but contemplates any and all modifications thereof that may fall within the scope of the claims hereunto appended.

What we claim is:

1. In combination with an automotive vehicle hydraulic brake system having a pedal operated master cylinder, hydraulic brake cylinders for the wheels, and an organization of pressure lines leading from said master cylinder to said brake cylinders: a first shutoff valve unit and a normally open pressure-responsive switch associated therewith interpolated in the line leading from the master cylinder to the brake cylinders of the front wheels; a second identical valve unit and pressure-responsive switch associated therewith interpolated in the line leading from the master cylinder to the brake cylinders of the rear wheels; a pair of signal lamps each controlled by one of said switches; each lamp being energizable in consequence of brake fluid loss in the line wherein it is interpolated; and means in each of said units instantly operable in consequence of such brake fluid loss for preventing further draining of brake fluid from the balance of the system, said means including a piston assembly slidable in a longitudinal bore provided at a lower level in the unit, a longitudinal bore in fluid communication with the master cylinder provided at an upper level in the unit, a longitudinal bore provided at an intermediate level in the unit, a first vertical bore connecting the upper and intermediate level bores, a second vertical bore interconnecting the upper, the intermediate and the lower level bores, a normally closed ball check valve in the upper level bore and a similar valve in the intermediate level bore, said check valves being adapted to open in opposite directions, and a compression spring in the lower level bore for propelling said piston assembly into a position wherein the piston thereof shuts off fluid communication between the lower level bore and said second vertical bore.

2. In a valve unit interpolated in the hydraulic brake system of an automotive vehicle for the purpose described in combination: a housing; upper, lower, and intermediate level longitudinal passageways and vertical connecting bores formed in the housing for transmission therethrough of hydraulic pressure from the master cylinder to the wheel brake cylinders of said system; a ball check valve in the upper and in the intermediate level passageway; a piston assembly floatingly disposed in the lower level bore, said piston assembly being normally maintained by hydraulic pressure in a position wherein the aforesaid transmission of hydraulic pressure through said valve housing is fluent; and a compression spring for instantly shifting the piston assembly from the said position thereof to a position wherein the transmission of hydraulic pressure through said valve housing is prevented whenever the hydraulic pressure in the system to one side of said piston assembly decreases in consequence of the loss of brake fluid in the line between said piston assembly and one of the wheel brake cylinders, said assembly including a piston proper, a ring element of resilient material for preventing the flow of brake fluid past said piston, and a circular end plate in engagement with a cup-shaped member wherein one end of said compression spring is seated, the other end of said spring being seated against a wall formed in said unit and defining one end of the lower level bore aforesaid.

3. A shutoff device interpolated in the hydraulic braking system of an automotive vehicle, said device including in combination: a valve housing; a first bored and counterbored passageway extending at an upper level from the inlet end to the outlet end of the housing; a second similar passageway extending at an intermediate level from the inlet to the outlet end of the housing; a longitudinal bore extending at a lower level from a vertical wall section provided in the inlet end thereof to the outlet end of the housing; a first vertical bore in the housing near the inlet end thereof connecting said first and second passageways; a second vertical bore in the housing near the outlet end thereof inter-connecting said first and second passageways and said longitudinal bore; a check valve in said first passageway preventing the flow of fluid therethrough in one direction; a check valve in said second passageway preventing the flow of fluid therethrough in the opposite direction; a piston assembly slidably disposed in said longitudinal bore and normally maintained by fluid pressure in a position wherein the lower end of said second vertical bore is in fluid communication with said longitudinal bore; a cup-shaped element slidably disposed in the longitudinal bore contiguous to said piston assembly; and a compression spring interposed in said longitudinal bore between the cup-shaped element and said vertical wall section of the housing, said spring biasing the piston assembly in a direction toward the lower end of said second vertical bore against the fluid pressure aforesaid, and being adapted to propel said assembly into a position wherein the lower end of said second vertical bore is shut off from fluid communication with said longitudinal bore simultaneously with the loss of said fluid pressure.

References Cited in the file of this patent

UNITED STATES PATENTS

| | | |
|---|---|---|
| 2,203,908 | Hess | June 11, 1940 |
| 2,332,301 | Cox | Oct. 19, 1943 |
| 2,389,962 | Dougherty | Nov. 27, 1945 |
| 2,674,095 | Kirk | Apr. 6, 1954 |
| 2,674,852 | Olman | Apr. 13, 1954 |